United States Patent [19]
Sauerwein et al.

[11] 3,843,891
[45] Oct. 22, 1974

[54] DEVICE FOR EXAMINING MATERIALS OR FOR SURGICAL TREATMENTS BY GAMMA RAY IRRADIATION

[75] Inventors: Kurt Sauerwein, Kattendahl 7, Hochdahl-Millrath; Hans Goedecke, Mettmann, both of Germany

[73] Assignee: said Sauerwein, by said Goedecke

[22] Filed: June 28, 1972

[21] Appl. No.: 267,223

[30] Foreign Application Priority Data
June 29, 1971  Germany............................ 2132167

[52] U.S. Cl................. 250/483, 250/497, 250/302
[51] Int. Cl. .......................................... G01j 39/18
[58] Field of Search............ 250/106 S, 71 R, 71 T, 250/483, 497, 302

[56] References Cited
UNITED STATES PATENTS

| | | | |
|---|---|---|---|
| 2,427,938 | 9/1947 | Wirshing............................ | 250/71 R |
| 2,798,164 | 7/1957 | Untermyer................... | 250/106 S |
| 2,953,684 | 9/1960 | MacHutchin................... | 250/106 S |
| 3,456,641 | 7/1969 | Yokota et al. .................... | 250/71 R |
| 3,578,973 | 5/1971 | Dooley............................ | 250/106 S |
| 3,643,096 | 2/1972 | Jefferies et al. ................. | 250/106 S |

*Primary Examiner*—Harold A. Dixon

[57] ABSTRACT

A device for examining materials or treating human or animal patients by local gamma ray irradiation. A capsule containing gamma ray emitting material is mounted in a shielding block. A flexible longitudinal, hollow, thrust-transmitting cable extends from a bore in said shielding block. A probe is mounted at the free end of the flexible cable. A flexible rod is longitudinally movably mounted in the flexible cable and carries the capsule at its free end for propelling and withdrawing the capsule through the cable. A material which becomes luminous when subjected to gamma ray irradiation is at least mounted on the device in the vicinity of the operative locations of the capsule. This material may also be mounted along the path of travel of the capsule, thereby illustrating the movement of the capsule.

11 Claims, 1 Drawing Figure

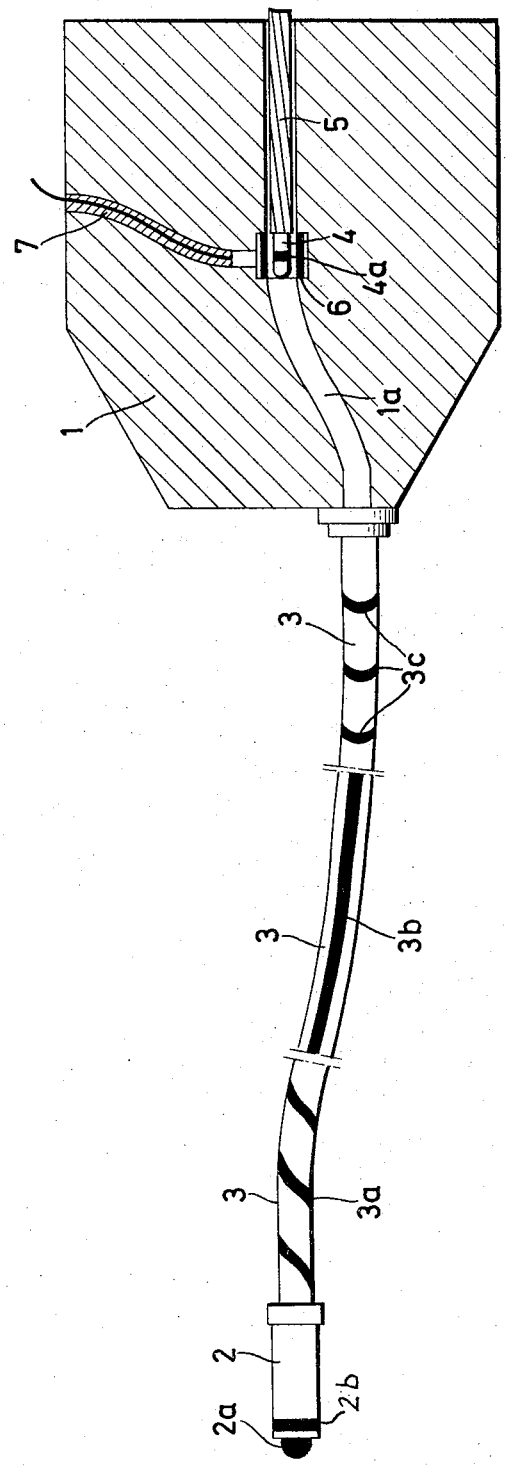

DEVICE FOR EXAMINING MATERIALS OR FOR SURGICAL TREATMENTS BY GAMMA RAY IRRADIATION

BACKGROUND OF THE INVENTION

The invention relates to a device for examining materials by means of gamma rays or treating human or animal patients by means of local gamma ray irradiation. A capsule containing gamma ray radiating material is mounted in a shielding block consisting of gamma ray opaque or absorbing material. This shielding block has a bore in which the capsule is located. The bore is in communication with a hollow, flexible, thrust-transmitting cable. A flexible rod is longitudinally movably mounted in the bore and hollow cable and carries at a free end the capsule. A probe is mounted at the free end of the hollow flexible cable.

Devices of the aforedescribed type are used for irradiating by means of radioactive substances of high intensity a predetermined object in as short a period of time as possible with high intensity.

It is very important in such devices to ascertain the exact location of the capsule carrying the radioactive material.

Devices of the aforedescribed type are, for example, disclosed in U.S. Pat. No. 3,669,093 of which the inventor of this application is a joint inventor. In the device described in this patent, the movement of the capsule is controlled by primarily mechanical means. Specifically in this patent there is disclosed a device in which the capsule is propelled out of the shielding block with the aid of a cable mounted on the shielding block. A probe closes the free end of a hollow cable and a flexible rod or cable is mounted in this hollow cable. This flexible rod or cable carries the capsule and is adapted to be propelled along the hollow cable until the capsule has reached the free end of the hollow cable. Spring means are provided on the flexible cable to maintain the capsule freely slidable within the hollow cable and also maintain it in certain predetermined operative positions. The two end positions of the capsule are controlled by means of two photoelectric cells mounted in the housing of the device. The photelectric cells scan the free end of the flexible cable on which the capsule is mounted. The various locations of the capsule can, however, not be determined by a person servicing the device unless one uses special means, for example, a Geiger-Counter, with the aid of which the capsule can be scanned and its path of movement can be visually and audibly observed. With such an arrangement the locating of the capsule is only possible outside of the shielding block.

SUMMARY OF THE INVENTION

It is accordingly a primary object of the present invention to provide a means on a device as described hereinabove for determining the location and observing the movement between predetermined locations of the capsule carrying the radioactive material. This improvement can become particularly significant when, for example, the capsule has been propelled by its flexible cable through the hollow cable up to its free end where the probe is mounted and cannot be retracted because of a malfunctioning or break of the flexible cable which is movable in the hollow flexible cable. In such a case the capsule can be axially located at any random position along the hollow cable or the bore within the shielding block even though the flexible cable, movable within the hollow cable, has been retracted with its free end into the interior of the housing and has passed the photoelectric cell mounted therein for detecting and scanning purposes.

Even less uncertain and indeterminable is the random position in a device similar to the aforedescribed type wherein the capsule is moved between two locations by means of pneumatic or hydraulic means.

The invention provides the means for determining and observing at any random position the location of the capsule in a device of the aforedescribed type. These means are mounted at predetermined locations on the flexible hollow cable or between such locations along the path of movement of the capsule. The means comprise a carrier on which there is material which becomes luminous upon irradiation by gamma rays during the entire period of irradiation.

A large number of materials are known in the art which become luminous upon irradiation by gamma rays. For the purposes of the invention, however, the fluorescent materials are most suitable while the phosphorescent materials, due to the after-illumination effect, are less suitable.

Materials which are suitable for the purposes of this invention can be in the gaseous, liquid, or solid state. For example, there are known in radiography the platinum-barium-cyanide-compounds and cadmium sulfide compounds which can be used in the form of crystalline or amorphous powder. Also, anthracite dissolved in benzene is suitable.

The nature of the compound, of course, determines the type of carrier that is to be used. Thus, for gaseous or liquid substances a hollow, transparent body is used as carrier, for example, a test tube or a double-walled tube made out of glass or plastic material which has closed ends thus defining an enclosed annular space. Such a tube is mounted immediately adjacent to the path of movement of the capsule or it can actually surround this path of movement. Liquid or solid substances can be combined with a lacquer-type carrier which is applied to the exterior or interior of the flexible hollow cable and will, after being so applied, solidify on the probe or the capsule if applied to the interior of the flexible hollow cable. The lacquer can be applied, that is, painted, in the form of rings, straight stripes, or helical stripes. The ring shapes are particularly suitable for the probe and the capsule, the exterior of which can be completely covered. The lacquer stripes are particularly suitable for the tubular or hose-type connection between the probe head and the shielding block.

It is also sometimes desirable to receive light signals when it is impossible to directly observe the probe head, for example, when such a probe head is situated in a hollow body or when it is desirable to ascertain the location of the capsule and it is situated inside the shielding block. The invention encompasses the provision of means for conducting light from such a visually inaccessible location. These means can consist of a bundle of light-conducting threads which form a cable, the cable extending from a visually accessible location to the visually inaccessible location. Such a light-conducting cable transmits the illumination of its end face by means of a light spot along long distances practically in undiminished intensity and will appear to an observer at the other end face as a light spot.

The end face which is mounted opposite a predetermined location or along the path of the capsule can itself be covered with a substance that becomes luminous upon the irradiation by gamma rays. Thereby, the object can be adjusted to a predetermined position. This can be carried out by providing a transparent container filled with gaseous or liquid material that becomes luminous upon gamma ray irradiation. This container extends from an object to be examined into the open end of a bore in a shielding block consisting of ray-absorbent material. The movement of the capsule carrying the irradiating material can be clearly observed in such an arrangement as a moving illuminated cone.

It is also within the concept of this invention to provide a material which becomes luminous upon the irradiation of gamma rays in the vicinity of the location of the device. This material coacts with a light-measuring device, such as a photocell, which measures the intensity of radiation emanating from the capsule and visually indicates this intensity by means of a light-measuring device known in the art.

BRIEF DESCRIPTION OF DRAWING

The invention is illustrated by way of example in the accompanying drawing which forms part of the application and in which:

The single FIGURE illustrates schematically and partially in cross-section a device in accordance with the invention.

DESCRIPTION OF A PREFERRED EMBODIMENT

The device illustrated in the drawing comprises a shielding block 1, consisting of ray-absorbing material, and the probe head 2. A hollow, flexible cable or conduit 3 connects the shielding block 1 and the probe head 2. A capsule 4, containing gamma-ray radiating material, is secured to the free end of a flexible cable 5 by soldering, welding, or gluing.

The probe head 2 is at its free front face provided with a calotte 2a. The calotte 2a is covered with a layer of lacquer containing a substance that becomes luminous upon the irradiation with gamma rays.

The cylindrical portion of the probe head 2 is also provided at its forward end with a ring 2b of the aforementioned lacquer material. The flexible hose or flexible hollow cable 3 can advantageously be covered with a stripe of the lacquer containing material which becomes luminous upon irridation by gamma rays. Thus it can be noted that the forward portion of the cable or hose 3 is shown to have a helical stripe 3a; the middle portion of the hose 3 is shown to have a straight stripe 3b; and the backward portion of the hose or flexible cable 3 is shown to have a plurality of rings 3c. It is to be understood that the hose or flexible cable 3 may be covered by any combination of the aforementioned stripes or by only one single type of stripe along its entire length. When the capsule 4 is in its inoperative position (as is illustrated in the single FIGURE of the drawing) it is located near the center of the shielding block 1. The latter block is provided with a guide channel 1a which is surrounded in the center of the shielding block 1 by a thin-walled jacket 6 the exterior of which is covered by the aforementioned lacquer. At least a portion of the lacquered surface of the jacket 6 is confronted by a light-conducting cable 7 which extends through a channel to the exterior of the shielding block 1. It should be noted that the channel, through which the light-conducting cable 7 extends as well as the channel 1a for accommodating the capsule 4 and cable 5, change direction several times. This is necessary in order to avoid the leaking of gamma rays from the shielding block 1. The light-conducting cable 7 extends to a point outside of the shielding block 1 at which it is accessible to an observer for ascertaining the presence of the capsule 4 inside the jacket 6.

It can be noted that the capsule 4 is also provided with a ring 4a of the aforementioned lacquer material. This ring of lacquer material can be dispensed with if the jacket 6 is provided with the lacquer material or if the internal end face of the light-conducting cable 7 is covered with the aforementioned lacquer material.

However, it is recommended to provide such a cover of lacquer material on the capsule 4 itself in order to safeguard against the possibility of a capsule containing gamma-ray irradiating substances becoming lost outside of the device or falls out of the device.

Although the invention is illustrated and described with with reference to one preferred embodiment thereof, it is to be expressly understood that it is in no way limited to the disclosure of such a preferred embodiment, but is capable of numerous modifications within the scope of the appended claims.

What is claimed is:

1. A device for examining material and for treating humans and animals with local gamma ray irradiation, comprising in combination,
    a shielding block of gamma ray absorbing material having a bore with at least one open end;
    a hose being mounted on said shielding block in substantially coaxial alignment with said bore;
    a probe head mounted at the free end of said hose;
    a flexible cable slidably disposed in said bore;
    a capsule mounted on the free end of said flexible cable;
    gamma ray emitting material in said capsule; and
    means operatively mounted on said device which become luminous upon irradiation with gamma rays including a carrier made of lacquer, said means which become luminous being formed by a ring of lacquer on said probe head;
    said flexible cable carrying said capsule being adapted to be propelled or retracted through said hose and said means becoming luminous when said capsule approaches.

2. The device for examining materials and for treating humans and animals with local gamma ray irradiation as set forth in claim 1, wherein said means which become luminous upon irradiation with gamma rays is embodied in gaseous form and includes a container made of transparent material defining an enclosed space in which this gaseous material is located.

3. The device for examining materials and for treating humans and animals with local gamma ray irradiation as set forth in claim 1, wherein said means which become luminous upon irradiation with gamma rays is embodied in liquid form and includes a container made of transparent material defining an enclosed space in which this liquid material is located.

4. The device for examining materials and for treating humans and animals with local gamma ray irradiation as set forth in claim 1, wherein said means are embodied in the form of a stripe of lacquer located on the outside of said hose.

5. The device for examining materials and for treating humans and animals with local gamma ray irradiation as set forth in claim 4, wherein said stripe is helically shaped and extends around said hose.

6. The device for examining materials and for treating humans and animals with local gamma ray irradiation as set forth in claim 1, wherein the capsule is at least partially covered with said lacquer.

7. The device for examining materials and for treating humans and animals with local gamma ray irradiation as set forth in claim 2, wherein said container extends from the open end of said bore to the free end of said hose.

8. A device for examining material and for treating humans and animals with local gamma ray irradiation, comprising in combination;
   a shielding block of gamma ray absorbing material having a bore with at least one open end;
   a hose being mounted on said shielding block in substantially coaxial alignment with said bore;
   a flexible cable slidably disposed in said bore;
   a capsule mounted on the free end of said flexible cable;
   gamma ray emitting material in said capsule; and
   means operatively mounted on said device hose which become lunimous upon irradiation with gamma rays;
   said flexible cable carrying said capsule being adapted to be propelled or retracted through said hose and said means becoming luminous when said capsule approaches;
   said means which become luminous are at least partially mounted in said device in a location which is not visible to a person servicing the device, and including a light-conducting cable mounted in said device for conducting light from said means which become luminous when irradiated by gamma rays to a location at which said light can be observed by a person servicing the device.

9. The device for examining materials and for treating humans and animals with local gamma ray irradiation as set forth in claim 8, wherein said light-conducting cable has an inner end face and an outer end face, said inner end face being covered with said lacquer.

10. The device for examining materials and for treating humans and animals with local gamma ray irradiation as set forth in claim 8, wherein said light-conducting cable has walls which are at least partially covered with said lacquer.

11. The device for examining materials and for treating humans and animals with local gamma ray irradiation as set forth in claim 8, wherein said light-conducting cable changes directions a plurality of times.

* * * * *